United States Patent [19]

Chang et al.

[11] Patent Number: 5,377,345
[45] Date of Patent: Dec. 27, 1994

[54] METHODS AND APPARATUS FOR PROVIDING MULTIPLE PENDING OPERATIONS IN A CACHE CONSISTENT MULTIPLE PROCESSOR COMPUTER SYSTEM

[75] Inventors: Jung-Herng Chang, Saratoga; Curt Berg, Sunnyvale; Jorge Cruz-Rios, San Jose, all of Calif.

[73] Assignee: Sun Microsystems, Inc., Mountain View, Calif.

[21] Appl. No.: 227,188

[22] Filed: Apr. 13, 1994

Related U.S. Application Data

[63] Continuation of Ser. No. 876,359, Apr. 29, 1992, abandoned.

[51] Int. Cl.$^5$ .............................................. G06F 12/08
[52] U.S. Cl. .............................. 395/425; 364/DIG. 1; 364/243.41; 364/243.45; 364/228.1
[58] Field of Search .................. 364/200, 900; 395/425

[56] References Cited

U.S. PATENT DOCUMENTS 4,315,310  2/1982  Bayliss et al. ...................... 395/275
4,493,026  1/1985  Olnowich ............................ 395/425

(List continued on next page.)

FOREIGN PATENT DOCUMENTS 0280954  2/1988  Germany.
2082808A  6/1981  United Kingdom.

OTHER PUBLICATIONS

Proceedings Second International Conference on Architectural Support for Programming Languages and Operations Systems (ASPLOS II), Oct. 5, 1987, Palo Alto, Calif., US pp. 72–81, Goodman 'Coherency for Multiprocessor Virtual Address Caches' p. 73, left column, line 16, p. 74, left column, line 15, FIG. 1, p. 77, FIG. 4.

(List continued on next page.)

*Primary Examiner*—Joseph L. Dixon
*Assistant Examiner*—Matthew M. Kim
*Attorney, Agent, or Firm*—Blakely Sokoloff Taylor & Zafman

[57] ABSTRACT

Apparatus and methods for a cache controller preserving cache consistency and providing multiple outstanding operations in a cache memory structure supporting a high performance central processor unit (CPU). An external cache array is coupled to both the CPU and a cache controller (CC), and is subblocked to reduce miss rate. The CC is coupled via a high speed bus to a main memory. A cache directory in the CC tracks usage of the external cache, and is organized to support a choice of bus protocols for buses intercoupling the CC to the main memory. The cache directory consists of tag entries, each tag entry having an address field and multiple status bit fields, one status bit field for each subblock. The status bit fields, in addition to shared-, owner-, and valid-bits, have a pending-bit which, when set, indicates a pending uncompleted outstanding operation on a subblock, and will prevent the CPU from overwriting the corresponding subblock. Two block miss registers in the CPU aid in prefetching subsequent subblocks upon subblock miss. The block miss registers further identify operations known to be pending but not particularly identified by the set pending-bit. One block miss register identifies a miss upon read, whereas the other block miss register identifies a miss upon write. An I/O count register in the CC tracks the number of I/O write operations outstanding but not yet completed, and prevents saturation of the I/O bus and buffer space. All outstanding write operations may be tracked with a single register. The CC also supports a PEND signal sent from the CC to the CPU to inform the CPU there exist outstanding write operations, to maintain store ordering in a multiple processor environment.

20 Claims, 6 Drawing Sheets

U.S. PATENT DOCUMENTS

| | | | |
|---|---|---|---|
| 4,794,521 | 12/1988 | Ziegler et al. | 395/425 |
| 4,977,498 | 12/1990 | Rastegar et al. | 395/425 |
| 5,018,063 | 5/1991 | Liu | 395/650 |
| 5,025,365 | 6/1991 | Mathur et al. | 395/600 |
| 5,025,366 | 6/1991 | Baror | 395/425 |
| 5,136,700 | 8/1992 | Thacker | 395/425 |
| 5,163,140 | 11/1992 | Stiles et al. | 395/425 |
| 5,197,146 | 3/1993 | LaFetra | 395/425 |
| 5,210,845 | 5/1993 | Crawford et al. | 395/425 |
| 5,228,134 | 7/1993 | MacWilliams et al. | 395/425 |
| 5,228,136 | 7/1993 | Shimizu et al. | 395/425 |
| 5,230,070 | 7/1993 | Liu | 395/425 |

OTHER PUBLICATIONS

ACM Transactions on Computer Systems vol. 7, No. 1, Feb. 1989, New York, US, pp. 78–117, Thompson et al. 'Efficient (Stack) Algorithms for Analysis of Write—Back and Sector Memories', p. 101, line 24, p. 102, line 9, FIG. 13.

Patent Abstracts of Japan, Morishima Kiyoshi, vol. 5, No. 17 (P-47) 31 Jan. 1981 & JP-A-55 146 682 (NEC Corp.) 15 Nov. 1980 p. 1 of 1.

METHODS AND APPARATUS FOR PROVIDING MULTIPLE PENDING OPERATIONS IN A CACHE CONSISTENT MULTIPLE PROCESSOR COMPUTER SYSTEM

This is a continuation of application Ser. No. 07/876,359 filed Apr. 29, 1992 now abandoned.

RELATED APPLICATIONS

This application is related to U.S. Patent Application Serial No. 07/879,611, entitled "Methods and Apparatus for Maintaining Cache Consistency Using a Single Copy of a Cache Tag Memory While Supporting Multiple Outstanding Operations in a Multiple Processor Computer System", filed May 7, 1992.

BACKGROUND OF THE INVENTION

1. Field of the Invention

The present invention relates to the field of computer systems and associated cache memory structures. More particularly, the present invention relates to a cache controller and associated registers to permit multiple overlapping cache access operations.

2. Art Background

Typically a central processing unit (CPU) in a computer system operates at a substantially faster speed than main memory. When the CPU executes instructions faster than memory can supply them, the CPU must idle until the next instruction datum upon which the instruction will operate is available. To avoid excessive CPU idle time while awaiting data or instructions from the large main memory, a smaller cache memory capable of operating at a higher speed than the main memory is often used to buffer the data and the instructions between the main memory and the CPU.

The data and instructions in memory locations of the main memory are mapped into the cache memory in block frames. Each block frame consists of a block offset corresponding to a number of memory locations storing data and instructions associated with that block. To further improve the overall CPU performance, some computer systems employ separate cache memories, one for data and one for instructions.

However, the use of separate cache memories does not entirely solve the performance problem. When a cache read "miss" occurs, that is, when the datum or instruction requested by the CPU is not in the cache memory, the cache memory must retrieve the datum or instruction from the main memory. To do so, typically the entire block frame of data or instructions including the requested datum or instruction is retrieved, and the CPU idles until the entire block frame retrieval is completed. Many other cache performance problems and improvement techniques exist, the reader being referred to, for example, J. L. Hennessy and D. A. Patterson, *Computer Architecture—A Quantitative Approach*, pp. 454–61, (Morgan Kaufmann, 1990).

The time necessary to fill the cache memory with the replacement block frame depends on the block size and the transfer rate of the cache memory-main memory hierarchy. For example, if the block size is eight (8) words and the speed of the main memory is two (2) words per three (3) dock cycles, then it takes eleven (11) dock cycles to fill the cache memory with the replacement block frame. However, reducing the block frame size or filling a partial block when a cache read miss occurs does not necessarily reduce CPU idle time, since smaller block size will increase the likelihood of future cache read misses.

Various techniques have been used to minimize the amount of CPU idle time waiting for the cache memory, and latency time waiting for completion of main memory accesses, when cache read misses occur. One common practice is "early restart", wherein as soon as the requested datum or instruction arrives in cache from main memory, it is sent to the CPU without waiting for the retrieval of the entire block to be completed. Using early restart, the CPU may resume execution of instructions upon receipt of the awaited instruction while the remainder of the replacement block frame is written to cache from main memory.

A further refinement of the early restart technique is "out of order fetch", wherein a request is made to main memory to retrieve the requested datum or instruction first, and skipping all the data or instructions before the requested datum or instruction in the replacement block frame. As in the case of early restart, the datum or instruction retrieved by out of order fetch is sent to the CPU as soon as it is retrieved, and the CPU may resume execution while the rest of the replacement block frame is being retrieved. After retrieving the requested datum or instruction, the main memory continues to retrieve the remaining data and instructions in the replacement block frame, starting with the data and instruction after the requested datum or instruction. The main memory then loops around to the beginning of the block frame to retrieve the previously skipped data or instructions, until the entire block frame is written to cache. Thus, the CPU can resume execution as soon as the first datum or instruction is retrieved from the main memory.

Traditional cache memories typically do not allow read and write operations to be performed against them in the same clock cycle. Thus, cache response to another request from the CPU while trying to fill the rest of the replacement block frame is quite complicated. As a result, the CPU typically idles again after the datum or instruction is executed, and waits for the remaining retrievals to be completed. The CPU will idle and wait for the remaining data or instructions being retrieved, even if the subsequent datum or instruction requested by the CPU is already in the cache memory. Thus, the benefits derived from early restart and out of order fetch are limited where the CPU is likely to complete its execution before the rest of the replacement block frame is written. This is especially likely to occur in computer systems where the number of clock cycles required to execute a typical instruction is small, for example, RISC (reduced instruction set computing) computers.

However, some modern cache memory structures allow read and write operations to be performed against them in the same dock cycle, thereby further reducing penalties associated with cache misses (particularly CPU idle time) and improving cache and overall system performance. For example, subsequent requests for data or instructions residing in the cache memory can be satisfied during the second half of the dock cycle. The problem is determining when the data or instructions are in the cache memory and synchronizing their transfer from the cache memory to the CPU during the second half of the dock cycle, without substantial investment in additional hardware. Likewise, a similar problem exists in satisfying the subsequent requests for data or instructions from the main memory.

Still more recently, computer systems having multiple processors have become common. In a multiple processor system, some or all of the several processors may simultaneously attempt to access the block flames stored in the cache, either for read or write purposes, and directing that data be routed to or from any of various sources and destinations with in the computer system. In a multiple processor system, proper system operation depends on maintaining proper correspondence of data stored in the cache with the corresponding processor, where any of several processors may access and alter cache-stored data. Correspondence of data to the proper processor is termed "cache consistency".

Thus, it is desirable to provide a new approach to controlling a cache memory to permit multiple outstanding read and write operations in an overlapping, substantially contemporaneous fashion in a high performance CPU that further reduces CPU idle time and latency between accesses to main memory and delivery of the requested instructions or data. It is particularly desirable if cache miss penalties are thereby reduced. It is also desirable if the hardware requirements necessary to implement the cache controller and associated control registers can be minimized.

As will be described in the following detailed description, these objects and desired results are among the objects and desired results of the present invention which overcomes the disadvantages of the prior art. The detailed description discloses a cache memory controller and methods for implementing a cache memory system for fetching data for a multiple processor computer system, and reducing CPU idle time by supporting multiple outstanding operations.

SUMMARY OF THE INVENTION

Apparatus and methods for a cache controller preserving cache consistency and providing multiple outstanding operations in a cache memory structure supporting a high performance central processor unit (CPU) are disclosed. The CPU includes an internal cache memory structure. A substantially larger external cache array having an appropriate number of blocks is coupled to both the CPU and the cache controller (CC) via a high speed integrated address and data bus (CPU bus). The CC is in turn coupled to a second high speed bus (MP bus) interconnecting processors, cache controllers, I/O devices, and memory devices forming a multiple processor system. The external cache is sub-blocked to reduce size of a cache directory by providing four subblocks per block.

A cache directory in the CC tracks usage of the external cache, and may be organized to support a choice of bus protocols for buses intercoupling the CC to the main memory. The cache directory consists of tag entries, each tag entry having an address field and multiple status bit fields, one status bit field for each subblock. The address field of the tag entry contains the physical address tag for a block of cache memory. Each of the status bit fields has a shared-bit, an owner-bit, and a valid-bit. In addition, each of the status bit fields has a pending-bit which, when set, indicates a pending uncompleted outstanding operation on a subblock. A set pending-bit will prevent the CPU from accessing data presently stored in the corresponding subblock.

Access to an entry in the cache directory is made via an index field contained within a CPU physical address. The CPU physical address also has a physical address tag field, subblock index, and subblock offset fields. There are provided sufficient bits in the index to uniquely access each entry in the cache directory.

A pair of block miss registers facilitate identification of operations known to be pending but not particularly identified by the set subblock pending-bit. One block miss register identifies a miss upon read, whereas the other block miss register identifies a miss upon write. Each block miss register is sized to store both the physical address tag and the cache directory index. The CC of the present invention does not impose an arrival order upon requested and prefetched subblocks. When a block miss occurs, the CC will prefetch the next sequential subblock, whereafter the physical address tag and the cache index are loaded into the block miss register. The CC will also set the pending bits for both the requested subblocks which resulted from the block miss, and from the prefetch, operations. When the first subblock retrieved arrives, the address tag associated with that subblock will not match the address in the address tag field in the cache directory. However, the address for the subblock will match the address stored in block miss register. Therefor, the valid-bits for all subblocks for the block are cleared, the address tag is updated, the valid-bit for only the appropriate subblock having data is set, and the pending-bit cleared. When the second subblock retrieved arrives, the address for that subblock will match the address in the address tag field in the cache directory, whereafter the valid for that subblock having data is set, and the corresponding pending-bit is cleared. If the address for a retrieved subblock does not match either the address stored in the block miss register or the address tag field in the cache directory, an error will be flagged to the operating system for error handling.

An I/O count register in the CC tracks the number of I/O write operations outstanding but not yet completed, and prevents saturation of the I/O bus and system buffer space. All outstanding write operations may be tracked with a single register. Physical I/O devices are assigned to I/O pages, each device being assigned to a unique page. Outstanding I/O operations are confined to a current I/O page. I/O operations issued to I/O pages other than the current page must wait until all outstanding operations to the current page are completed, prior to initiation. The CC will increment the I/O count register when issuing the I/O operation to the I/O device, and decrement the count register when acknowledgment is received by the CC that the I/O operation has been completed. If an I/O operation attempts to access an I/O device assigned to an I/O page other the current page, then the CPU will retry the operation, until the I/O count for the current I/O page is zero. The design and maximum count available in the I/O count register, although internal to the CC, any external cache arrangement must know the maximum I/O count for proper design of buffer space between the CC and the I/O bus. An I/O page address register coupled to an external bus watcher device also tracks the page addresses associated with the outstanding I/O operations, and issues a time-out notification when an I/O operation fails for that I/O page. Because unique page addresses are assigned to each I/O device, time-outs sent by any I/O device will be logged to the I/O page assigned to that I/O device. Similarly, a shared write count register permits tracking the number of outstanding write operations outstanding for cacheable data being written to main memory.

The CC also supports a PEND signal sent from the CC to the CPU to indicate that there exist outstanding write operations in a multiple processor environment. Supporting the PEND signal permits the CPU to implement either total store ordering or partial store ordering for sequenced I/O write operations. Asserting the PEND signal constrains a subsequently issued write operation to await completion of a previously issued write operation. Although absolute performance is thereby reduced, store ordering is maintained.

BRIEF DESCRIPTION OF THE DRAWINGS

The present invention will be understood more fully from the detailed description given below and from the accompanying drawings of the preferred embodiment of the invention in which.

DETAILED DESCRIPTION OF THE INVENTION

Apparatus and methods for a cache controller preserving cache consistency and providing multiple outstanding operations in a cache memory structure supporting a high performance central processor unit (CPU) are disclosed. In the following description, for purposes of explanation, specific numbers, times, signals etc., are set forth in order to provide a thorough understanding of the present invention. However, it will be apparent to one skilled in the art that the present invention may be practised without these specific details. In other instances, well known circuits and devices are shown in block diagram form in order not to obscure the present invention unnecessarily.

Figure 1:
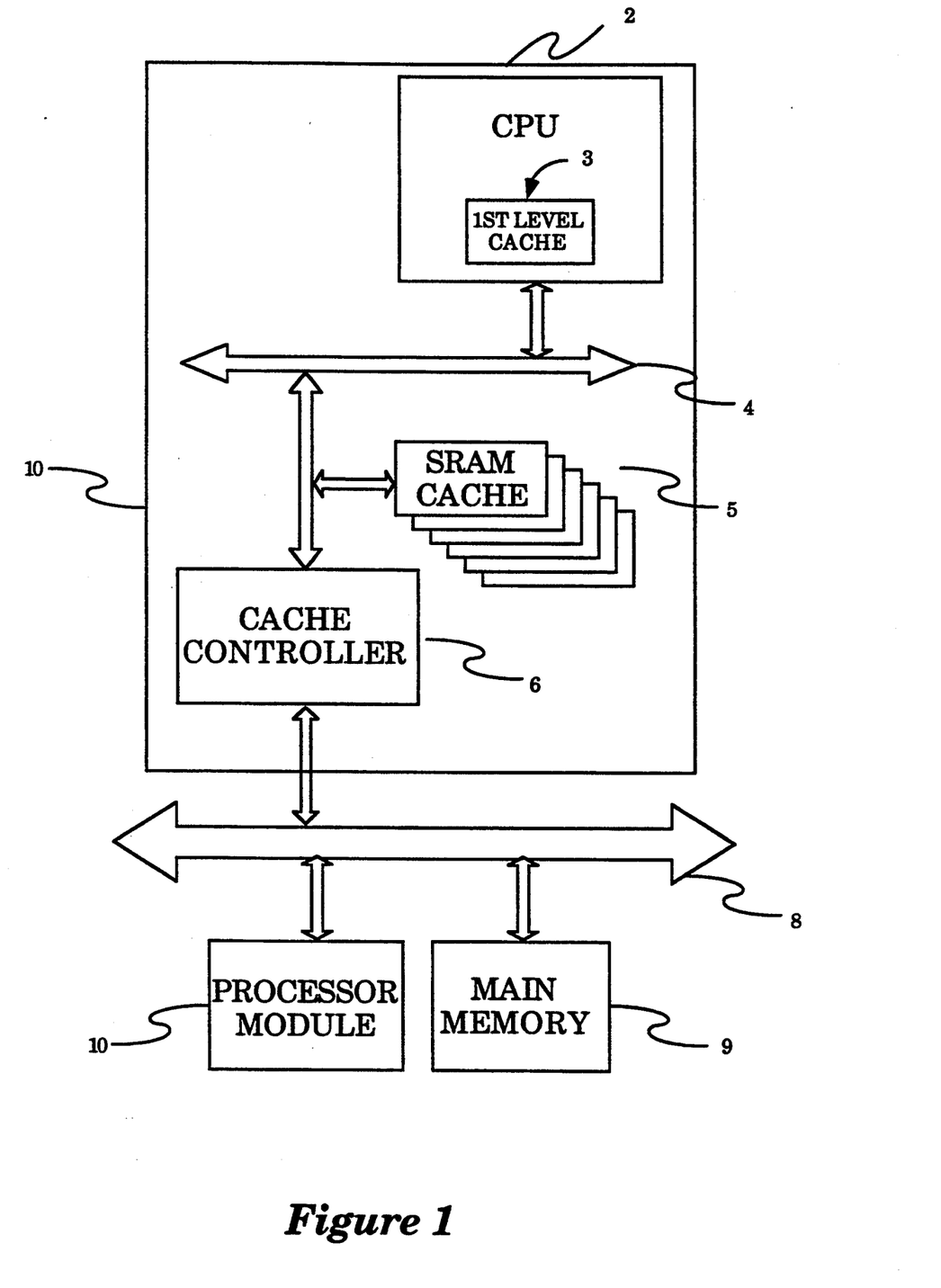
FIG. 1 is a block diagram overview of an external cache memory and a cache controller incorporating the teachings of the present invention.

Reference is now made to FIG. 1, wherein a block diagram overview of an external cache memory and a cache controller (CC) in a multiple processor high performance computer system incorporating the teachings of the present invention are shown. In FIG. 1, a CPU 2 is interconnected via a CPU bus 4 to an external cache arrangement 5. Cache arrangement 5 is controlled by a cache controller (CC) 6, wherein CPU 2, CPU bus 4, cache arrangement 5 and CC 6 form a processor module 10. Processor module 10 is in turn is intercoupled via a multiple processor bus (MP bus) 8 to a main memory arrangement 9, and other processor modules 10. CPU 2 further has an internal cache arrangement 3. Internal cache arrangement 3 is an integrated on-chip cache structures for CPU 2, and is of substantially smaller size relative to external cache arrangement 5. Although the present invention does not impose any specific speed requirements for the memory devices forming external cache arrangement 5 and main memory 9, it is generally assumed that the devices forming cache arrangement 5 are smaller and faster than components forming main memory 9. CPU bus 4 is assumed to be of any type suitable to accommodate a high performance processor, but may, as in the case of the present invention, be optimized to operate with a particular processor architecture, in this case the Viking processor designed by Sun Microsystems, Inc., Mountain View, Calif. 94043.

Figure 2:
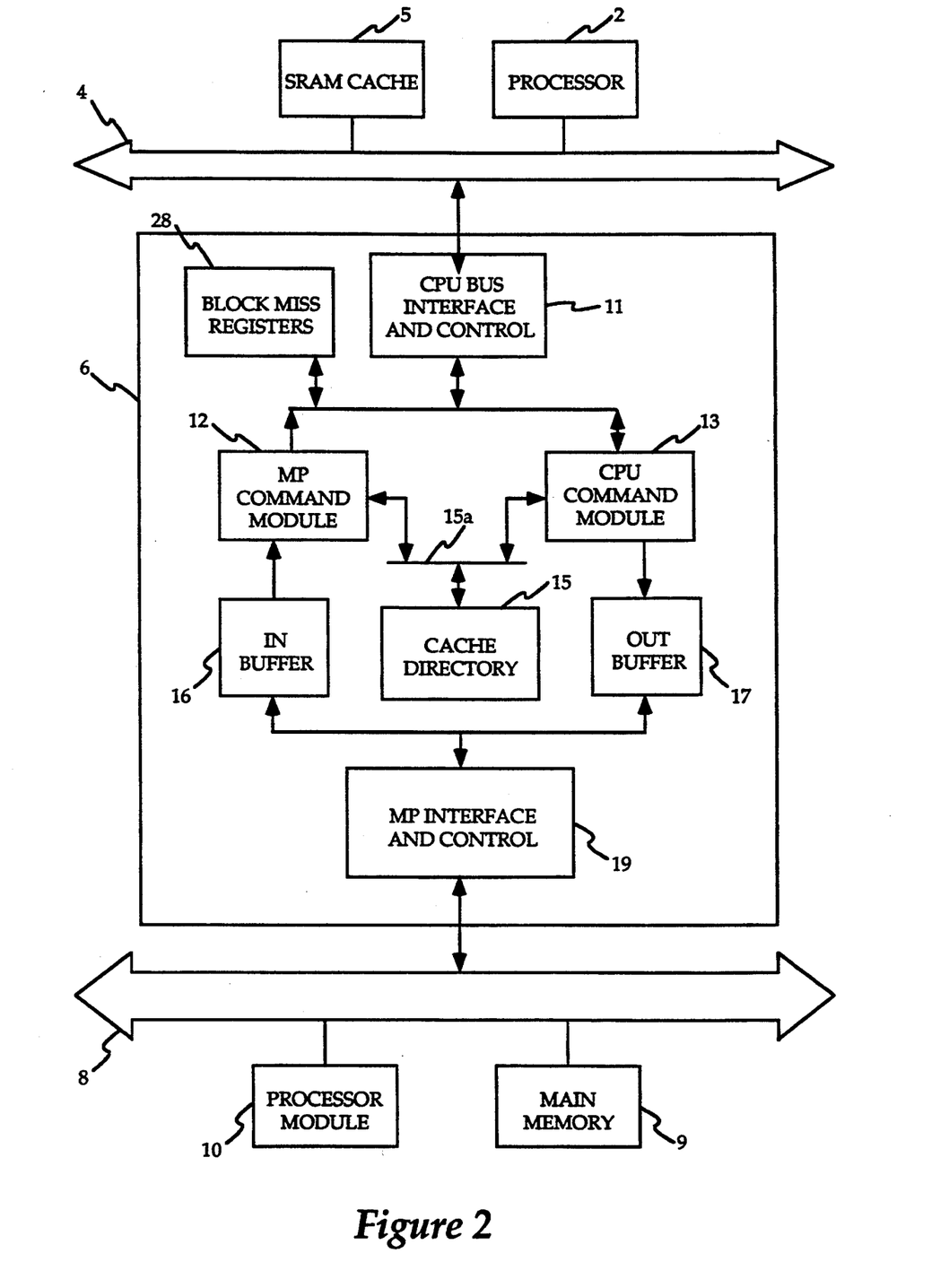
FIG. 2 is a functional block diagram of the cache controller.

Referring now to FIG. 2, a block diagram illustration of the cache controller 6 is shown. In FIG. 2, CPU bus 4 is connected to a CPU bus interface and control unit 11, which controls access to CPU bus 4 in accordance with an internal arbiter (not shown). CPU bus interface and control unit 11 is connected in two-way communication with a CPU command module 13 and an MP command module 12. MP command module 12 processes bus requests and replies, and in certain cases snooping requests, sourced from bus 8. CPU command module 13 processes all incoming commands from processor 2, and if necessary generates proper commands to permit processor 2 to gain control of bus 8. A cache directory 15 is intercoupled to MP command module 12 and CPU command module 13 via a local internal cache directory bus 15. Cache directory 15 will be described in more detail below.

Figure 2A:
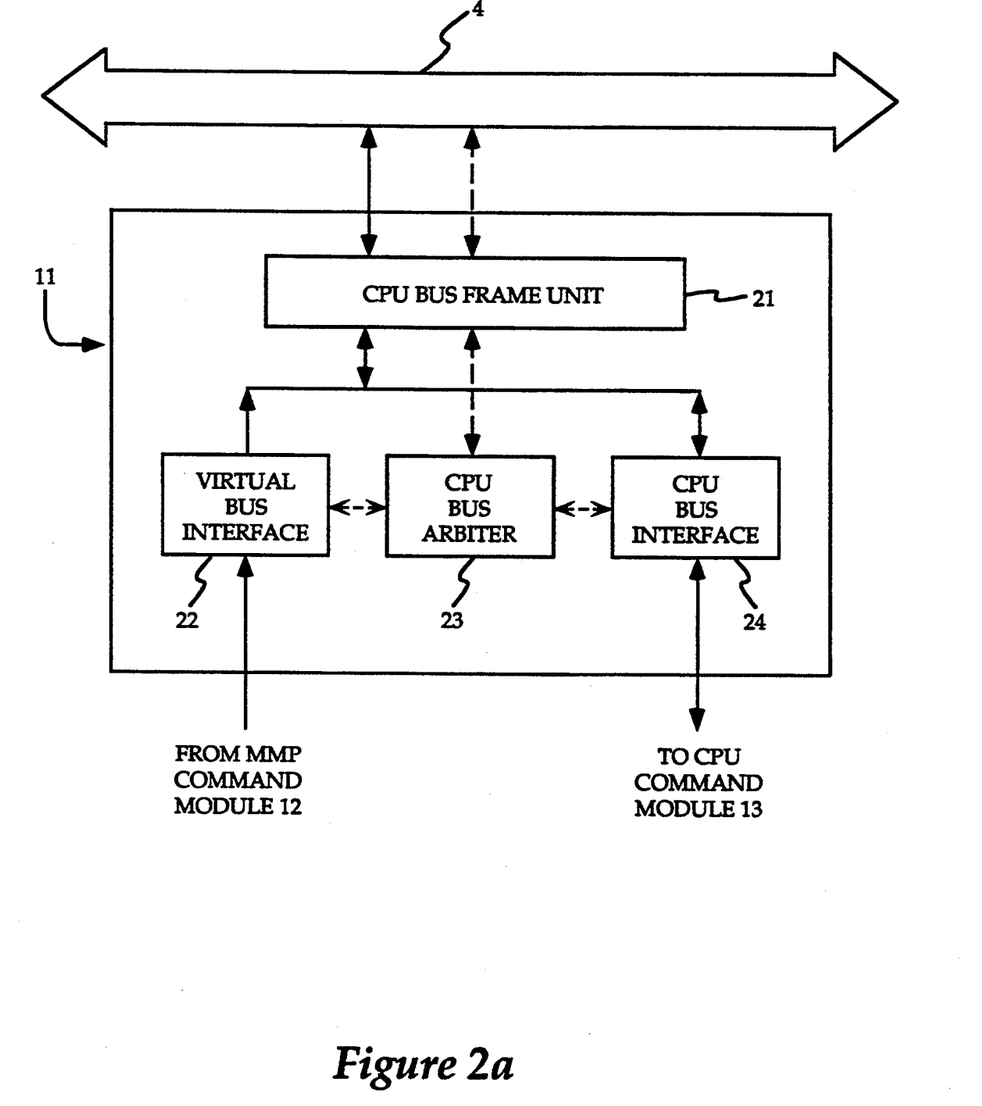
FIG. 2a is a functional block diagram of a multiple processor bus interface and control unit inside the cache controller.

With brief reference to FIG. 2a, a more detailed illustration of CPU bus interface and control unit 11 is shown. In FIG. 2a, MP bus interface and control unit 11 consists of an CPU bus input/output (I/O) frame unit 21 containing all drivers, receivers, and latches for outgoing and incoming signals from bus 4. CPU bus interface and control unit 11 further contains a virtual bus interface 22, a CPU bus arbiter 23, and a CPU bus interface 24. Virtual bus interface 22 permits the MP command module 12 to freely write to external cache arrangement 5 (shown in FIG. 1) without requiring arbitration. Rather, virtual bus interface 22 provides an illusion a constantly free CPU bus 4, relieving MP command module 12 from dealing with complexities associated with the CPU bus 4 arbitration protocol. Virtual bus interface 22 has in the preferred embodiment a $9 \times 107$ bit buffer to buffer up to nine cycles of CPU bus 4 accesses made by virtual bus interface 22 by MP command module 12. CPU bus arbiter 23 controls and grants requests for access to CPU bus 4. CPU bus arbiter 23 also regulates bus protocol used for bus 4. Finally, CPU bus interface 24 internally latches all input signals received from bus 4 before passing the signals to other devices within CC 6.

Although not illustrated, CC 6 in the preferred embodiment supports two different clock frequencies. In particular, in the preferred embodiment of the present invention, CPU bus 4 operates at a higher frequency than MP bus 8 to accommodate the high speed data transmission rates of high performance processor 2. A pair of buffers 16 and 17 enable communication between CPU 2 operating on CPU bus 4 and devices operating on MP bus 8. Buffers 16 and 17 are first-in-first-out devices implemented with dual-port register files, operating between the two clock domains.

A second, MP bus interface and control unit 19 is interconnected to buffers 16 and 17, and governs data communications with external devices intercoupled to CC 6 over MP bus 8. MP bus interface and control unit 19 performs functions analogous to functions performed by CPU bus interface and control unit 11. MP bus interface and control unit 19 includes an arbiter (not shown), bus interface units (not shown), and drivers and receivers (not shown) necessary to send and receive signals from CC 6 to devices intercoupled by bus 8, and in particular main memory 9. The features described but not shown in reference to bus interface and control unit 19 are widely known in the art, and do not require further discussion here.

As described in connection with FIGS. 1, 2, and 2a, CC 6 provides control of external cache arrangement 5 of a computer system incorporating multiple processors. CC 6 further provides a communications interface between the multiple processors and the balance of the computer system. CC 6 can support two different bus interconnections which use external cache memory structures and: MBus-based systems and Dynabus-based systems. In the MBus-based system, CC 6 is directly connected to the MBus (shown as bus 8 in FIGS. 1 and 2). Alternatively, in the Dynabus-based system, CC 6 is connected to an XBus configuration. The size of the external cache arrangement is larger in the Dynabus arrangement than in the MBus arrangement, is due to the use of larger subblock sizes. However, the specific attributes of the present invention are independent of the bus system selected, and for the remainder of this detailed description no distinction will be made between MBus configurations and Dynabus configurations.

Further, as described in connection with FIGS. 1, 2, and 2a, the external cache arrangement 5 is organized as a direct-map cache. The size may be 1 megabyte (MB), or optionally 2 MB in the case of a Dynabus-based system. Again, because the organization of the cache is identical in both bus implementations except for size and subblock size, the remainder of the detailed description will use the 1 MB cache construct. To implement the 1 MB cache in the preferred embodiment, eight (8) 128K×9 (or 128K×8) static random access memory (SRAM) chips are used. Subblocking is used to reduce the size of cache directory 15 within CC 6. Subblocking was developed to overcome the large miss penalty of large blocks, and also to reduce the tag storage requirements within small cache directory structures. As presently preferred, the subblock size is 32 bytes (B) for the MBus-based system. Stored data is transferred, and cache consistency protocol is maintained, on the subblock basis. Further, the CC 6 incorporates a single-copy cache tag directory according to the teachings disclosed in the above-referenced U.S. Patent Application entitled "Methods and Apparatus for Improving Maintaining Cache Consistency Using a Single Copy of a Tag Memory While Supporting Multiple Outstanding Operations in a Multiple Processor Computer System", which is hereby incorporated by reference.

As will be described in more detail below, CC 6 incorporating the teachings of the present invention can support pipelined access to the external cache arrangement 5 from processor 2 interconnected to CC 6 via bus 4. In the presently preferred embodiment, a peak data transfer rate of one double-word (DW) per instruction cycle for both read and write operations is expected. When a read (or write) access results in a miss, that is, the data or instruction sought is not within the blocks stored in cache arrangement 4, processor 2 can still access the cache arrangement for a write (or read) operation, until another miss occurs.

Figure 3:
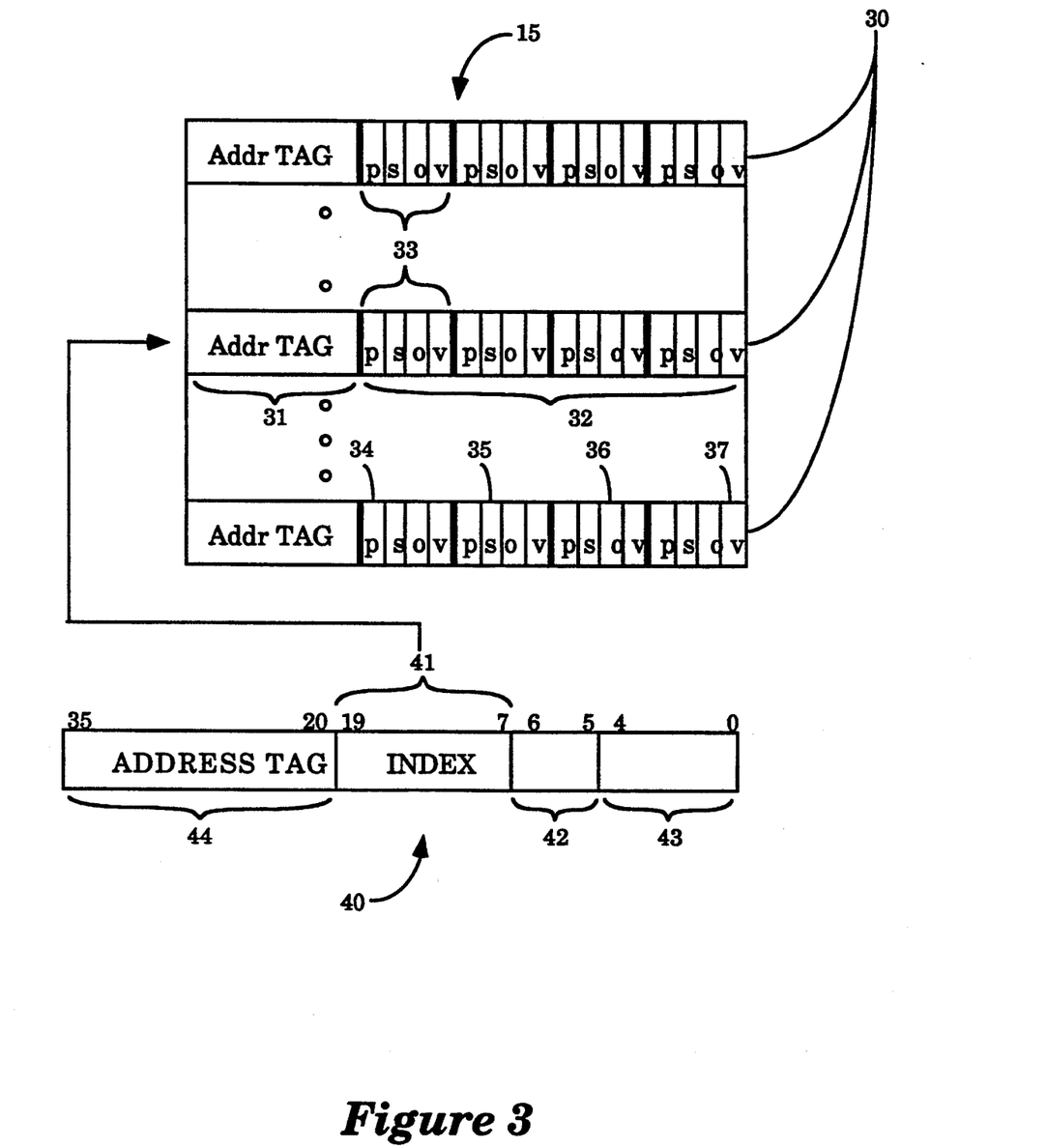
FIG. 3 is a functional block diagram of the external cache directory, illustrating an exemplary directory entry selected by an index.

Reference is now made to FIG. 3, wherein a more detailed illustration of cache directory 15 is shown. In FIG. 3, cache directory 15 is generally constructed as is known in the art, having a multiplicity of tag entries 30, there being one entry for each block in the cache arrangement 5. As set out above, the cache arrangement 5 in the preferred embodiment consists of nominally 8K blocks, each 128 B in size. Therefore, cache directory 15 will similarly have 8K tag entries 30. Each tag entry 30 consists of an address tag 31, and a multiplicity of status bit fields 32. The address tag 31 stores the full physical address, but not the index bits, for the data referenced by the particular block identified by entry 30. The status bit fields 32 correspond to the subblock present in the block referenced by entry 30. In particular, there is one status bit field 32 for each subblock comprising the block, and there is only a single address tag identifying the several subblocks in that block.

Each status bit field 32 stores four status bits 33: a p-bit 34, an s-bit 35, an o-bit 36, and a v-bit 37. The s-bit 35, o-bit 36, and v-bit 37 are, respectively, a shared-bit, an owner-bit, and a valid-bit, and all function as is well known in the art of memory systems. S-bit 35 when set indicates that the corresponding subblock is shared. O-bit 36 when set indicates that the corresponding subblock executed the most recent write operation. V-bit when set to one indicates the corresponding subblock is valid.

Cache block frames within cache arrangement 5 are accessed via an index 41 forming part of an address 40. Address 40 thereby enables access to cache arrangement 5 in a known manner: index 41 essentially points to the particular tag entry 30 according to bit pattern of index 41. Additionally, offsets within block and subblocks are indicted by offset fields 42 and 43.

The present invention adds an additional status bit to the status bits previously known in the art, namely the p-bit 34 which is a pending-bit. P-bit 34 when set indicates that an operation assigned by CPU 2 is outstanding and still pending on the subblock of the block referenced by index 41 within address 40, and the subblock index 42. The p-bit 34 is also set when a prefetch operation is initiated.

P-bit 34 permits multiple operations to be assigned to different blocks or even different subblocks without waiting for completion of previously issued commands, while still only requiring a single address tag 31 to identify all subblocks. P-bit 34, when set, prevents accessing the corresponding subblock by enabling CC 6 to require accessing CPU 2 to relinquish the CPU bus 4, and "retry" the access later. By having CC 6 monitor p-bit 34, CC 6 will permit a subsequent operation on a subblock having p-bit 34 set only when the previous operation is completed and p-bit 34 cleared. When CPU 2 accesses a subblock whose p-bit 34 is not set, and the access results in a miss, the p-bit 34 is first set, whereafter a memory access is made to retrieve data to cache arrangement 5 and the address tag bits 31 are updated, and the p-bit 34 is cleared.

A block miss register 28 facilitates identification of operations known to be pending but not particularly identified by the set subblock pending-bit. Block miss register 28 identifies both a miss upon read and a miss upon write. Block miss register 28 is sized to store both the physical address tag and the cache directory index. CC 6 of the present invention does not impose an arrival order upon requested and prefetched subblocks. When a block miss occurs, CC 6 will prefetch the next sequential subblock, whereafter the physical address tag 44 and the cache index 41 are loaded into the block miss register. CC 6 will also set the pending bits 34 for both the requested subblocks which resulted from the block miss, and from the prefetch, operations. When the first subblock retrieved arrives, the address tag 44 associated with that subblock will not match the value in the address tag field 31 in the cache directory 15. However, the address tag 44 for the subblock will match the address stored in block miss register 28. Therefor, the valid-bits 37 for all subblocks for the block are cleared, the address tag 31 is updated, the valid-bit 37 for only the appropriate subblock having data is set, and the pending-bit 34 cleared. When the second subblock retrieved arrives, the address 44 for that subblock will match the address in the address tag field 31 in the cache directory 15, whereafter the valid bit 37 for that subblock having data is set, and the corresponding pending-bit 34 is cleared. If the address 44 for a retrieved subblock does not match either the address stored in the block miss register 28 or the address tag field 31 in the cache directory 15, an error will be flagged to the operating system for error handling.

In operation of the present invention, data acquisition can proceed substantially contemporaneously, that is in a substantially pipelined fashion, wherein access requests are issued one at a time, but where a subsequent request is issued prior to completion of a previously issued cache memory access. When a CPU accesses cache arrangement 5 via index 41, bits of address tag 31 are immediately examined to determine if they match the address bits of the control space reference.

Figure 4:
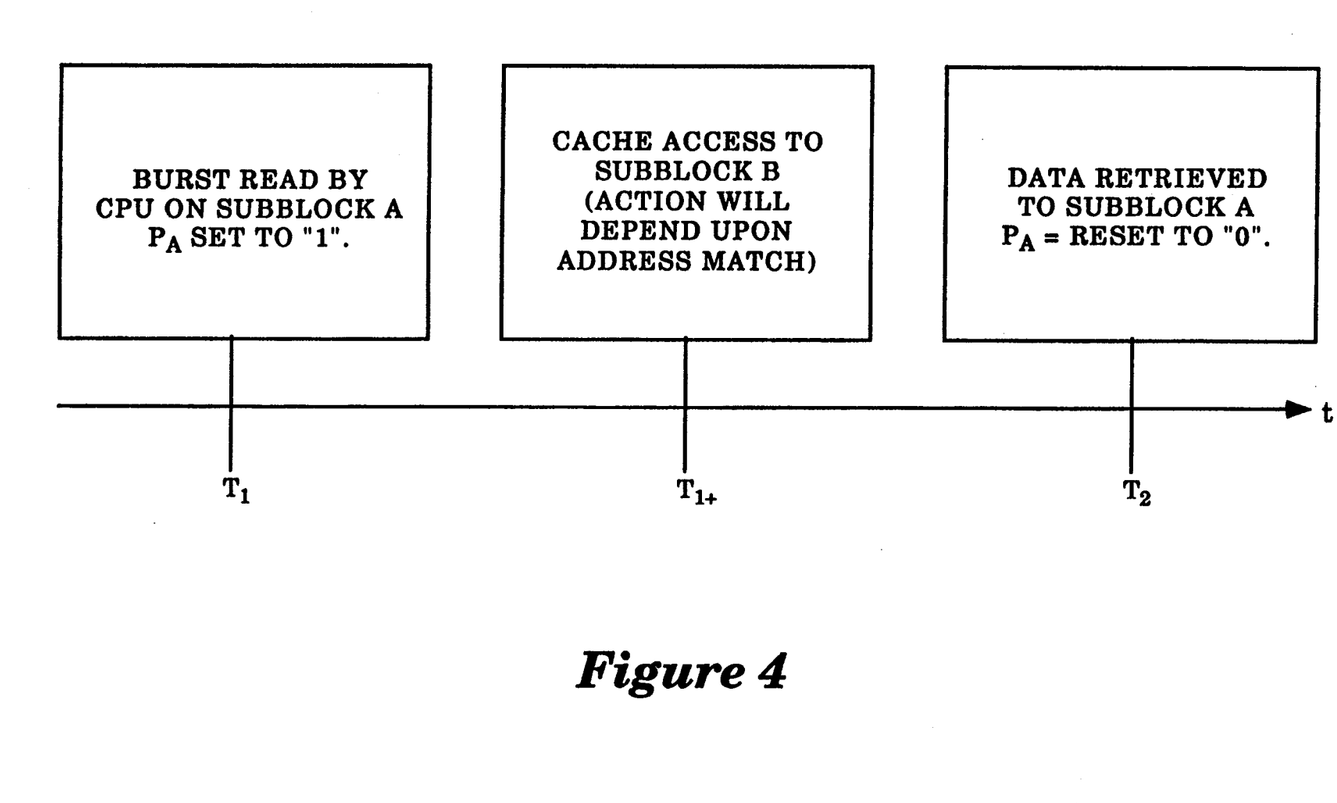
FIG. 4 is time line showing an exemplary sequence of cache access operations.
Figure 5:
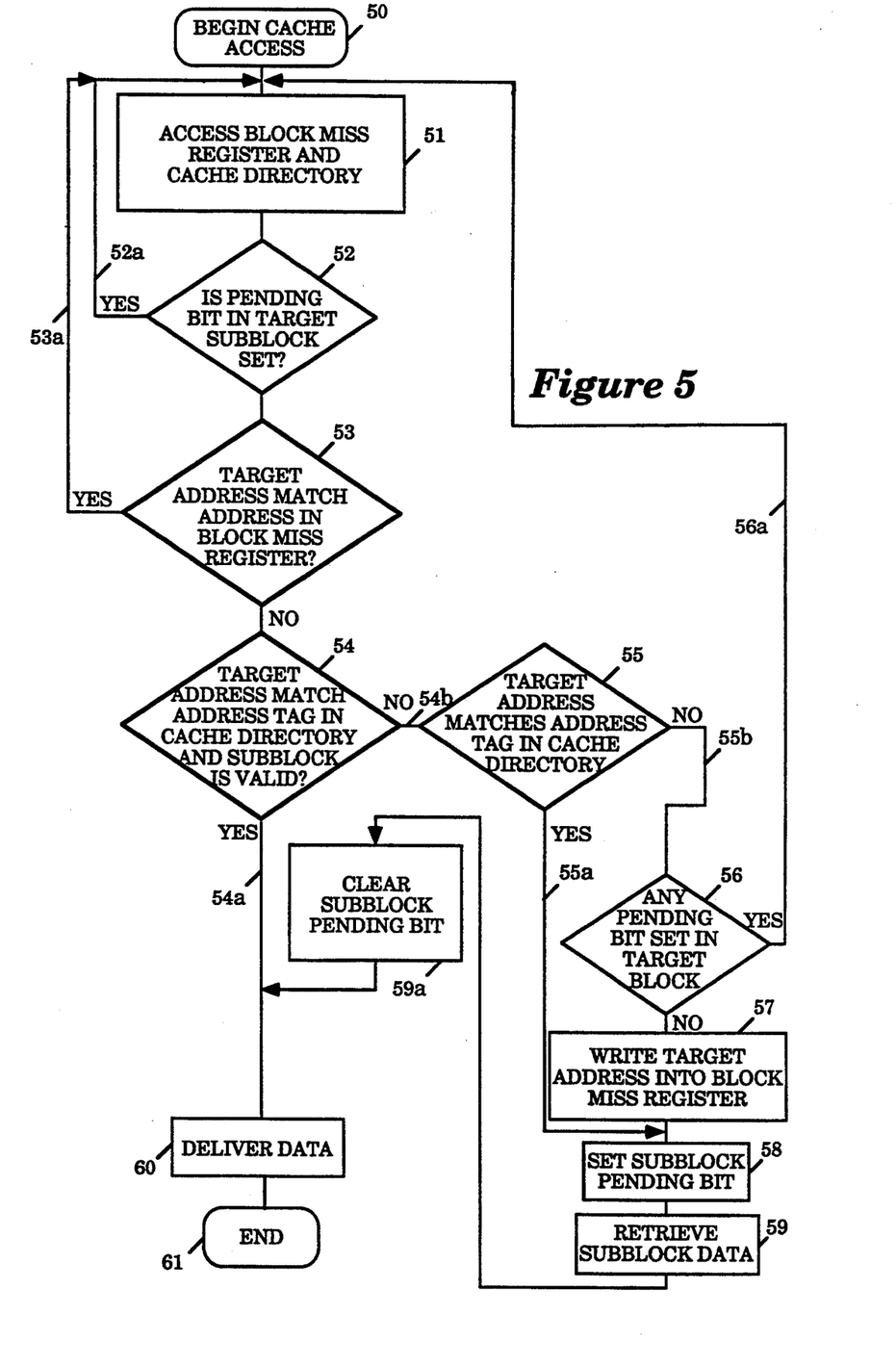
FIG. 5 is an operations flow diagram showing an exemplary sequence of cache access operations.

Operation of CC 6 incorporating the present invention may be best explained in association with the illustrated example shown in FIG. 4 and exemplary operations flow diagram shown in FIG. 5. In FIG. 4, for example, a CPU is shown to issue a cache memory operation at time $T_1$, say a burst read, resulting in a miss on subblock A of the external cache arrangement 5. Pending-bit (p-bit) 34 will be set, and the requested data retrieved to subblock A of cache 5 from main memory 9 at some later time $T_2$, whereafter p-bit 34 is cleared. Pending completion of the memory access associated with subblock A, no processor can access subblock A because the CC 6 will always determine that subblock A is busy, as indicated by p-bit 34. However, further operations on other subblocks, say subblock B, within the same block may still proceed at times subsequent to $T_1$, for example at time $T_{1+}$, provided the corresponding p-bits 34 are not set, and provided the cache access attempts to subblocks A or B have not resulted in a block miss. If a block miss occurs, say on subblock B at time $T_1$, CPU 2 will be instructed to retry even if p-bit 34 for subblock B is not set. In this case, the present invention operates as any prior art cache arrangement, where a block miss requires a main memory access cycle, prior to any other access. Alternatively, if address tag 31 pointed to by index 41 of address 40 matches address tag 44 within address 40, the accessing CPU can access any subblock not marked busy by the corresponding p-bit 34. Where address tag 31 matches address tag 44, that is, where there is a block hit, a subblock miss will result in fetching the subblock as well as the immediately subsequent subblock.

In FIG. 5, operations flow occurring during multiple processor acquisition of a target subblock is shown. The effect of pending-bit 34 in the operation of CC 6 during cache access attempts may be summarized as follows:

1. If any operation is issued on a subblock whose p-bit 34 is set, the CPU will be instructed to retry.
2. If an operation results in a block miss on a block having any p-bit 34 set for any of its subblocks, the CPU will be instructed to retry.

Assume a cache access operation (50) is initiated by CPU 2. CC 6 initially accesses block miss register 28 and cache directory (block 51). CC 6 next determines whether pending-bit 34 is set for the target subblock (block 52). If pending-bit 34 is set, CC 6 commands the accessing CPU 2 to retry the access later (52a). Alternatively, if pending-bit 34 is clear (52), CC 6 further determines whether the address of the addressed subblock matches the address stored in block miss register 28 (block 53). If a match exists, CPU 2 is instructed to retry (53a), there being a pending operation for the block containing the addressed subblock. Thereafter, CC 6 further determines (block 54) whether the address of the addressed subblock matches the address tag 31 in the cache directory 15, and whether the corresponding subblock is valid. If yes (54), then valid data is delivered to CPU 2 and the cache reference is completed (block 61). If there is no match (54b) found at block 54, then CC 6 determines whether the address of the addressed subblock matches the address tag in cache directory 15 (block 55). If yes (55a), CC 6 sets pending-bit 34 for the target subblock accessed (58), after which data is retrieved from the subblock (block 59). Thereafter, the pending bit 34 is cleared (block 59a) and data delivered to CPU 2 (block 60). If no match is found at block 55, CC 6 determines whether pending bit 34 is set for any subblock in the addressed cache block (block 56). If any pending bit 34 is set, CPU 2 will be instructed to retry (56a). If no pending bits are set at block 56, CC 6 will write the address of the addresses subblock into block miss register 28 (block 57). Thereafter, CC 6 sets pending-bit 34 for the target subblock accessed (58), after which data is retrieved from the subblock (block 59). The pending bit 34 is then cleared (block 59a) and data delivered to CPU 2 (block 60). The memory reference is then ended at block 61.

In general, after any pending-bit 34 is set, CC 6 will direct any cache operation directed to that subblock will be commanded to retry. CC 6 then ascertains whether the target subblock contains the target data by comparing (the physical memory address 44 given in the virtual address 40 with the address tag 31 in the cache directory 15. If the target data is found, it is delivered to CPU 2 when CPU 2 retries. Otherwise, CC 6 will initiate a main memory access cycle to retrieve the target data. Once the target data is delivered to CPU 2, pending-bit 34 is cleared, and the subblock again becomes accessible to any CPU.

The cache arrangement 5 and CC 6 further employ a block miss register (not shown) to enable the previously mentioned prefetch feature, and to determine what has been indicated as pending but not particularly identified. The prefetch feature operates to reduce memory latency, such that upon a burst read access to a subblock, it will prefetch the next subblock, bounded by the block boundary, if the valid bit for the subsequent subblock is clear. As presently preferred, the block miss function is implemented via only two standard registers. One block miss register identifies a miss upon read, whereas the other block miss register identifies a miss upon write. Each block miss register is sized to store both the physical address and the cache directory index.

As stated previously, CC 6 of the present invention does not impose an arrival order upon requested and prefetched subblocks. When a block miss occurs, the CC 6 will prefetch the next sequential subblock, whereafter both the physical address 44 and the cache index 41 are loaded into the block miss register. When the retrieved subblock is received after a miss, the address field 31 for the block containing the subblock is updated and the valid-bit 37 for that subblock is set. If the address field 31 of the prefetched subblock matches the address stored in the block miss register for which the block miss occurred, then it is known that the prefetched subblock was returned first. When the first subblock retrieved arrives pursuant to either a subblock fetch or prefetch, the valid-bits 37 for all subblocks for the block are cleared, and then the valid-bit 37 and pending-bit 34 for only the appropriate subblock having data are set and cleared, respectively. It should be noted that the pending-bit 34 is not cleared for remaining subblocks, because the prefetch operation may still be outstanding itself. In such a case the retrieved prefetch data will appear as a subblock miss, whereafter the p-bit 34 is cleared and the valid-bit 37 is set. The importance of block miss register 28 is simply to prevent access to the subblocks of the block which has a pending block miss.

An I/O count register (not shown) tracks the number of I/O write operations outstanding but not yet completed, and prevents saturation of the I/O bus 8 and associated buffer space. All outstanding write operations may be tracked with a single register. Physical I/O devices are assigned to I/O pages, each device being assigned to a unique page. The reader should note that the I/O pages are not physical pages, but merely convenient units of address space assigned to each I/O device as the implementation may require. I/O operations to these I/O devices are not permitted to arbitrarily access the I/O pages, but rather are confined to the current I/O page. The CC 6 will increment the I/O count register when issuing the I/O operation to the I/O device, and decrement the count register when acknowledgment is received by the CPU 2 that the I/O operation has been completed. If an I/O operation attempts to access an I/O device assigned to an I/O page other the current page, then CPU 2 will be instructed to retry the operation, until the count indicated by I/O count register for the current page is zero. The design and maximum count available in the I/O count register, although contained within the CC 6 is necessary for proper design of buffer space between the CC and the I/O bus. An I/O physical address register coupled to an external bus watcher device also tracks the physical addresses of devices associated with the outstanding I/O operations, and issues a time-out notification when an I/O operation fails for that I/O physical address. Because unique physical addresses are assigned to each I/O device, time-outs sent by any I/O device will be logged to the I/O page assigned to that I/O device.

Similarly, a shared-write count register and a shared-write physical address register permit tracking the number of outstanding write operations outstanding for cacheable data being written to main memory.

The CC 6 and cache arrangement 5 also support a PEND signal sent from the CC 6 to the CPU 2 to inform CPU 2 there exist outstanding write operations in a multiple processor environment. Supporting the PEND signal permits the CPU 2 to implement either total store ordering or partial store ordering for sequenced I/O write operations, at the users option. Asserting the PEND signal constrains a subsequently issued write operation to await completion of a previously issued write operation. Although absolute performance is thereby reduced, store ordering can be maintained.

The foregoing has described apparatus and methods for preserving multiple outstanding operations in a cache memory structure. It is contemplated that changes and modifications may be made by one of ordinary skill in the art, to the device components and arrangements of elements of the present invention without departing from the spirit and scope of the invention.

We claim:

1. In a computer system having a central processing unit (CPU) and a main memory, a cache memory structure comprising:

a cache coupled to said CPU by a first bus, said cache including a plurality of blocks each including a plurality of sub-blocks for storing data, said CPU including means for issuing a plurality of cache operations attempts to target sub-blocks;

a cache controller including a cache directory coupled to said cache, said CPU, and said main memory;

said cache directory including a plurality of tag entries each including address tags, with each of said tag entries further including a plurality of sets of status bit fields, with each of said blocks having a corresponding tag entry, and with each of said sub-blocks having a corresponding set of status bit fields for storing a plurality of state status bits for indicating a plurality of states of target data stored in said corresponding sub-block;

said cache controller also including operation pending notification means, coupled to said cache directory and to said CPU, for examining said set of status bit fields corresponding to a target sub-block which is subject to a new cache access operation and for identifying whether said target subblock which is subject to said new cache access operation is already subject to a previously issued cache access operation and, if so, for commanding said CPU to reissue said new cache access operation.

2. The cache memory structure according to claim 1, wherein said new cache access operation is accepted by said cache controller for a second target sub-block while said previously issued cache operation is pending for a first target sub-block.

3. The cache memory structure according to claim 1, wherein if said new cache access operation results in a block miss, then said cache controller instructs said CPU to retry said cache access operation.

4. The cache memory structure according to claim 1 further comprising an input/output (I/O) count register coupled to said CPU, said I/O count register identifying a number of I/O write operations issued by said CPU that are pending;

said CPU incrementing said I/O count register when an I/O operation is issued;

said CPU decrementing said I/O count register when an I/O operation is completed.

5. The cache memory structure according to claim 1, wherein a plurality of said CPUs are provided each connected to said cache, said cache controller and said main memory and wherein each of said plurality of sets of state status bits for indicating said states comprise:

a shared state status bit, when set, for indicating that data stored in a corresponding target sub-block is shared between two or more of said CPUs;

an owner state status bit, when set, for indicating that said data stored in said corresponding target sub-block is owned by only one of said plurality of CPUs;

a valid state status bit, when set, for indicating that said data stored in said corresponding target sub-block is valid; and, a pending state status bit, when set, for indicating that said corresponding target sub-block has been accessed in a previously issued cache access operation;

said pending state status bit, when set, for further indicating that said previously issued cache access operation is still pending and outstanding, and that said data stored in said corresponding target subblock is not accessible.

6. The cache memory structure according to claim 5, wherein:

if said new cache access operation results in a sub-block miss for a target sub-block, said cache controller instructs a CPU issuing said cache access operation to retry said cache access operation of said sub-block only if said pending state status bit corresponding to said target sub-block is set; and if said pending state status bit is not set, then said cache controller instructs said CPU issuing said cache access operation of said sub-block to access any remaining sub-block within the block containing the target subblock which has a clear pending state status bit in a corresponding tag entry.

7. The cache memory structure according to claim 5 further comprising block miss identification means coupled to said cache controller for selecting a target sub-block to be retrieved if said new cache access attempt results in a block miss;

said block miss identification means storing a cache directory index and a physical address identifying corresponding target data stored in said main memory corresponding to the target sub-block causing the block miss;

said block miss identification means further coupled to prefetch means for retrieving a subsequent sub-block when the pending state status bit for said target sub-block is set, said block miss identification means identifying whether said subsequent sub-block is retrieved prior to retrieval of said target sub-block.

8. The cache memory structure according to claim 7, wherein:

if said new cache access attempt results in a sub-block miss, said cache controller signals said prefetch means to prefetch said subsequent sub-block, said cache controller thereafter loading said cache directory index and physical address corresponding to the target data into said block miss register;

when said subsequent sub-block is retrieved, said cache controller thereafter updating the address tag of the cache directory index corresponding to the subsequent sub-block, setting the valid state status bit in the status bit field of said subsequent sub-block, and clearing the pending state status bit in the status bit field of said subsequent sub-block.

9. The cache memory structure according to claim 7, wherein said block miss identification means comprises a block miss register;

said block miss register coupled to each of said CPU's and said cache controller for identifying a block miss occurring during a read operation issued by one of said CPU's;

said block miss register further identifying a block miss occurring during a write operation issued by one of said CPU.

10. In a computer system having processor modules including a central processing unit (CPU) and a main memory, a method for cache memory operations comprising the steps of:

providing a cache coupled to said CPU, said cache including a plurality of blocks each including a plurality of sub-blocks for storing data;

providing a cache controller including a cache directory coupled to said cache, said CPU, and said main memory; providing a plurality of tag entries within said cache controller each including address tags with each of said tag entries further including a plurality sets of status bit fields with each of said blocks having a corresponding tag entry, and with each of said sub-blocks having a corresponding set of status bit fields for Storing a plurality of state status bits for indicating a plurality of states of target data stored in said corresponding sub-block; and, providing operation pending notification means coupled to said cache directory and to said CPU for examining said set of status bit fields corresponding to a target sub-block which is subject to a new cache access operation and for identifying whether said target sub-block which is subject to a new cache access operation is already subject to a previously issued cache access operation and, if so, for commanding said copy to reissue said new cache access operation.

11. The method according to claim 10, wherein said new cache access operation is accepted by said cache controller for a second target sub-block while previously issued cache operation is pending for a first target sub-block.

12. The method according to claim 10, wherein if said new cache access operation results in a block miss, then said cache controller instructs said CPU to retry said cache access operation.

13. The method according to claim 10 further comprising the step of providing an input/output (I/O) count register coupled to said CPU for identifying a number of I/O write operations issued by said CPU that are pending, said method further comprising:

incrementing said I/O count register an I/O operation is issued, and decrementing said I/O count register when an I/O operation is completed.

14. The method according to claim 10, wherein a plurality of said CPU's are provided each connected to said cache, said cache controller, and said main memory and wherein providing each of said plurality of state status bits comprises:

providing a shared state status bit indicating, when set, said data stored in a corresponding target sub-block is shared between two or more of said CPU's;

providing an owner state status bit indicating, when set, that said data stored in said corresponding target sub-block is owned by only one of said plurality of CPU's;

a valid state status bit indicating, when set, indicating that said data stored in said corresponding target sub-block is valid; and, providing a pending state status bit, when set, indicating that said corresponding target sub-block has been accessed in said previously issued cache operation;

said pending state status bit, when set, further indicating that said cache operation is still pending and outstanding, and that said data stored in said corresponding target sub-block is not alterable.

15. The method according to claim 14, wherein if said new cache access attempt results in a sub-block miss for a target sub-block, said cache controller instructs a CPU issuing said cache access operation to retry said cache access operation of said sub-block only if said pending state status bit corresponding to said target sub-block is set, and, if said pending state status bit is not set, said cache controller then instructing said CPU issuing said cache access operation to access any remaining sub-block within the block containing the target sub-block which has a clear pending state status bit in a corresponding tag entry.

16. The method according to claim 14 further comprising the step of providing block miss identification means coupled to said cache controller for selecting a target sub-block to be retrieved if said new cache access attempt results in a block miss;
    providing further prefetch means, coupled to said block miss identification means, for retrieving a subsequent sub-block;
    storing a cache directory index and a physical address in said block miss register identifying target data stored in said main memory corresponding to the target sub-block causing the block miss;
    when the pending state status bit for said target sub-block is set, said block miss identification means identifying whether said subsequent sub-block is retrieved prior to retrieval of said target sub-block.

17. The method according to claim 16, wherein;
    if said new cache access attempt results in a sub-block miss, signaling said prefetch means to prefetch said subsequent sub-block, said cache controller thereafter loading said cache directory index and physical address corresponding to the target data into said block miss register;
    when said subsequent sub-block is retrieved, updating the address tag of the cache directory index corresponding to the target data and setting the valid state status bit in the status bit field of said subsequent sub-block.

18. The method according to claim 16, wherein providing said block miss identification means comprises providing a block miss register;
    said block miss register coupled to each of said CPU's and said cache controller for identifying a block miss occurring during a read operation issued by one of said CPU's;
    said block miss register further identifying a block miss occurring during a write operation issued by one of said CPU's.

19. In a computer system having processor modules including a central processing unit (CPU) and a main memory, a cache memory structure comprising:
    a cache coupled to said CPU by a first bus, said cache including a plurality of blocks each including a plurality of sub-blocks;
    a cache controller including a cache directory coupled to said cache, said CPU and said main memory;
    said cache directory including a plurality of tag entries each including address tags, with each of said tag entries further including a plurality sets of status bit fields, with each of said blocks having a corresponding tag entry, and with each of said sub-blocks having a corresponding set of status bit fields for storing a plurality of state status bits for indicating a plurality of states of target data stored in said corresponding sub-block;
    said cache controller also including operation pending notification means, coupled to said cache directory, for examining said set of status bit fields corresponding to a target sub-block which is subject to a new cache access operation and for identifying whether said sub-block which is subject to a new cache access operation is already subject to a pending cache access operation and for commanding said CPU to reissue said new cache access operation;
    an input/output (I/O) count register coupled to said CPU, said I/O count register identifying a number of I/O write operations issued by said CPU that are pending
    said CPU incrementing said I/O count register when an I/O operation is issued; and
    decrementing said I/O count register when an I/O operation is completed.

20. In a computer system having processor modules including a central processing unit (CPU) and a main memory, a method for cache memory operations comprising the steps of:
    providing a cache coupled to said CPU, said cache including a plurality of blocks each including a plurality of sub-blocks for storing data;
    providing a cache controller including a cache directory coupled to said cache, said CPU and said main memory;
    providing a plurality of tag entries including address tags, with each of said tag entries further including a plurality of sets of status bit fields, with each of said blocks having a corresponding tag entry, and with each of said subblocks having a corresponding set of status bit fields for storing a plurality of state status bits for indicating a plurality of states of target data stored in said corresponding sub-block;
    providing operation pending notification means, coupled to said cache directory and to said CPU, for examining said set of status bit fields corresponding to a target subblock which is subject to a new cache access operation and for identifying whether said sub-block which is subject to a new cache access operation is already subject to a previously issued cache access operation and, if so, for commanding said CPU to reissue said new cache access operation;
    providing an input/output (I/O) count register coupled to said CPU, said I/O count register identifying a number of I/O write operations issued by said CPU that are pending; and
    incrementing said I/O count register when an I/O operation is issued; and
    decrementing said I/O count register when an I/O operation is complete.

* * * * *

UNITED STATES PATENT AND TRADEMARK OFFICE
CERTIFICATE OF CORRECTION

PATENT NO. : 5,377,345
DATED : December 27, 1994
INVENTOR(S) : Chang et al.

It is certified that error appears in the above-identified patent and that said Letters Patent is hereby corrected as shown below:

In column 13, claim 9 at line 68, please delete " CPU " and insert -- CPU's --.

In column 14, claim 10 at line 16, please delete " Storing " and insert -- storing --.

Signed and Sealed this

Third Day of November, 1998

*Attest:*

BRUCE LEHMAN

*Attesting Officer*

*Commissioner of Patents and Trademarks*